United States Patent
Sioli

(10) Patent No.: US 7,112,380 B2
(45) Date of Patent: Sep. 26, 2006

(54) METHOD AND APPARATUS FOR THE STORAGE AND REDISTRIBUTION OF ELECTRICAL ENERGY

(75) Inventor: Giancarlo Sioli, Cernobbio (IT)

(73) Assignee: Casale Chemicals S.A., Lugano-Besso (CH)

( * ) Notice: Subject to any disclaimer, the term of this patent is extended or adjusted under 35 U.S.C. 154(b) by 0 days.

(21) Appl. No.: 10/156,030

(22) Filed: May 29, 2002

(65) Prior Publication Data

US 2002/0195349 A1    Dec. 26, 2002

(30) Foreign Application Priority Data

May 30, 2001 (EP) ................................ 01113229

(51) Int. Cl.
| | |
|---|---|
| H01M 8/06 | (2006.01) |
| H01M 8/08 | (2006.01) |
| H01M 8/04 | (2006.01) |
| C25B 1/10 | (2006.01) |
| C25B 9/08 | (2006.01) |

(52) U.S. Cl. ................ 429/21; 429/14; 204/DIG. 4; 204/252; 204/253; 204/258; 205/628; 205/343

(58) Field of Classification Search ............... 429/12, 429/17; 205/628, 633, 637; 204/242, 275.1, 204/278, DIG. 4
See application file for complete search history.

(56) References Cited

U.S. PATENT DOCUMENTS

| | | | | | |
|---|---|---|---|---|---|
| 3,070,703 | A | * | 12/1962 | Podolny | 290/2 |
| 3,484,617 | A | * | 12/1969 | Winsel | 290/44 |
| 3,956,013 | A | * | 5/1976 | Miyoshi et al. | 429/19 |
| 4,087,976 | A | * | 5/1978 | Morrow et al. | 60/643 |
| 4,235,693 | A | * | 11/1980 | Rowe et al. | 204/228.2 |
| 4,305,793 | A | * | 12/1981 | Broniewski | 205/345 |
| 4,490,232 | A | * | 12/1984 | Lapeyre | 204/278 |
| 5,041,197 | A | * | 8/1991 | Gelb | 205/343 |
| 5,407,756 | A | | 4/1995 | Sprouse | |
| 6,926,982 | B1 | * | 8/2005 | Ito et al. | 429/21 |
| 2002/0051898 | A1 | * | 5/2002 | Moulthrop et al. | 429/17 |

FOREIGN PATENT DOCUMENTS

| | | |
|---|---|---|
| JP | 09 120 831 A | 9/1997 |
| JP | 10 055 816 A | 2/1998 |
| JP | 11 354 132 A | 12/1999 |

(Continued)

OTHER PUBLICATIONS

W.L. Hughes et al.: "An Energy System for the Future" IEEE Transactions on industrial Electronics IE-10, No. 1, May 1, 1963, pp. 101-111 XP001031023.

(Continued)

Primary Examiner—Harry D. Wilkins, III
(74) Attorney, Agent, or Firm—Sughrue Mion, PLLC

(57) ABSTRACT

A method of storage and redistribution of electrical energy comprising the steps of: producing hydrogen and oxygen through water electrolysis in an electrolyzer (1) operating under pressure; collecting the hydrogen and oxygen so obtained in respective pressurized tanks (3, 5); reconverting into water and electrical energy hydrogen and oxygen, through an electrochemical reaction of the latter in a fuel cell (9) fed from the tanks (3, 5), distinguishes itself by the fact that in the electrolyzer (1) and in the fuel cell (9) a same liquid phase is used and by the fact that the water produced in the fuel cell (9) by the hydrogen and oxygen reconversion step, is collected in the respective liquid phase and transferred together with the liquid phase to the electrolyzer (1) in order to undergo electrolysis.

10 Claims, 1 Drawing Sheet

FOREIGN PATENT DOCUMENTS

JP          2001 130 901 A      5/2001

OTHER PUBLICATIONS

F. Baron et al.: "European Regerative Fuel Cell Technology for space Use" European Space Power, Madrid, Oct. 2-6, 1989, Proceedings of the European Space Power Conference, Noordwijk, ESA Publications, NL, vol. 1. pp. 221-226, XP000163951.

W. Tillmetz et al.: "Regerative Fuel Cells for Space and Terrestrail Use" Proceedings of the 25th Intersociety Energy Conversion Engineering Conference. IECEC-90, Reno., Aug. 12-17, 1990, Proceedings of the Intersociety Energy Conversion Engineering Conference, New York, IEEE, US, vol. 3, Conf. 25, pp. 154-158, XP000215922.

* cited by examiner

METHOD AND APPARATUS FOR THE STORAGE AND REDISTRIBUTION OF ELECTRICAL ENERGY

FIELD OF APPLICATION

In its broader aspect, the present invention relates to a method for the storage and redistribution of electrical energy through electrolytic production of hydrogen and oxygen and the following recombination in an appropriate fuel cell, with production of water and electrical energy.

The invention also relates to an apparatus for carrying out such method, of the type comprising a water electrolyzer, tanks for hydrogen and oxygen generated in said electrolyzer and a fuel cell fed from said tanks.

PRIOR ART

Storage and redistribution systems of electrical energy used nowadays have been proposed as an alternative to the cumbersome lead accumulators in order to guarantee a suitable energy supply to prioritised users, or else to form a valid energy storing means between discontinuous primary sources (solar energy, wind energy) and electrical users with continuous adsorption diagrams or anyway having an adsorption diagram which is not in compliance with the availability of energy from said sources.

Such storing systems of the prior art are essentially based on a set of apparatuses and devices, each of which forms a separate substantially independent unit operation with respect to the others units, with which it is practically connected and/or serviced only at the stage of overall project.

Thus, for example, an electrical energy storage system of the mentioned type comprises a water electrolyzer that generates hydrogen and oxygen and that can operate under pressure or at atmospheric pressure, pressurized tanks, wherein hydrogen and in case oxygen are stored under pressure and a fuel cell wherein the electrochemical recombination of oxygen and hydrogen, fed from said tanks, takes place. All these components, even if mutually associated and installed with all the respective numerous functional fittings in a single container in order to facilitate their transportation, are always stand-alone units, used independently for water electrolysis, for gas collection and for the reconversion of hydrogen in electrical energy and water, respectively.

Apart from the acknowledged structural and functional complexity of the storage systems of the prior art, the complicated operations required for putting them into operation, due, for example, to the need of obtaining from time to time suitable interconnections between the system components, to the need of using numerous functional fittings such as pumps, compressors, pressure reducers and alike, such systems have the drawback of a limited flexibility of use and of a not always satisfying overall yield.

The problem underlying the present invention is that of providing a new way of operating for obtaining electrical energy storage and redistribution systems, that allows the drawbacks of the prior art to be overcome, with particular reference to the overall yield of the entire system, its operational efficiency as well as that of the single components thereof, the compactness of the apparatus used, its flexibility of use and last but not least its ease of transportation.

SUMMARY OF THE INVENTION

The technical idea for solving the aforesaid problem is that of using the water produced by the hydrogen reconversion step within the fuel cell for the electrolysis step.

Based upon such an idea, the above mentioned technical problem is solved according to the invention by a method of storage and redistribution of electrical energy comprising the steps of: producing hydrogen and oxygen through water electrolysis in an electrolyzer operating under pressure; collecting the hydrogen and oxygen so obtained in respective pressurised tanks; reconverting into water and electrical energy hydrogen and oxygen, through an electrochemical reaction of the latter in a fuel cell fed from said tanks, and characterized by the fact that in said electrolyzer and in said fuel cell a same liquid phase is used, and by the fact that the water produced in said fuel cell by the hydrogen and oxygen reconversion step, is collected in the respective liquid phase and transferred together with the liquid phase to said electrolyzer in order to undergo electrolysis.

Advantageously, said hydrogen and oxygen reconversion in said fuel cell is carried out under pressure.

Preferably, said electrolyzer is in direct communication with said tanks, to which the hydrogen and oxygen obtained through water electrolysis are directly sent, and said tanks are in direct communication with said fuel cell.

BRIEF DESCRIPTION OF THE DRAWINGS

The features and the advantages of the method of the present invention will become clearer from the following description of an example for carrying out the same with reference to an apparatus for the storage and redistribution on electrical energy schematically shown in an indicative and non-limiting way in the single FIG. 1 of the attached drawing.

DETAILED DESCRIPTION

Figure 1:
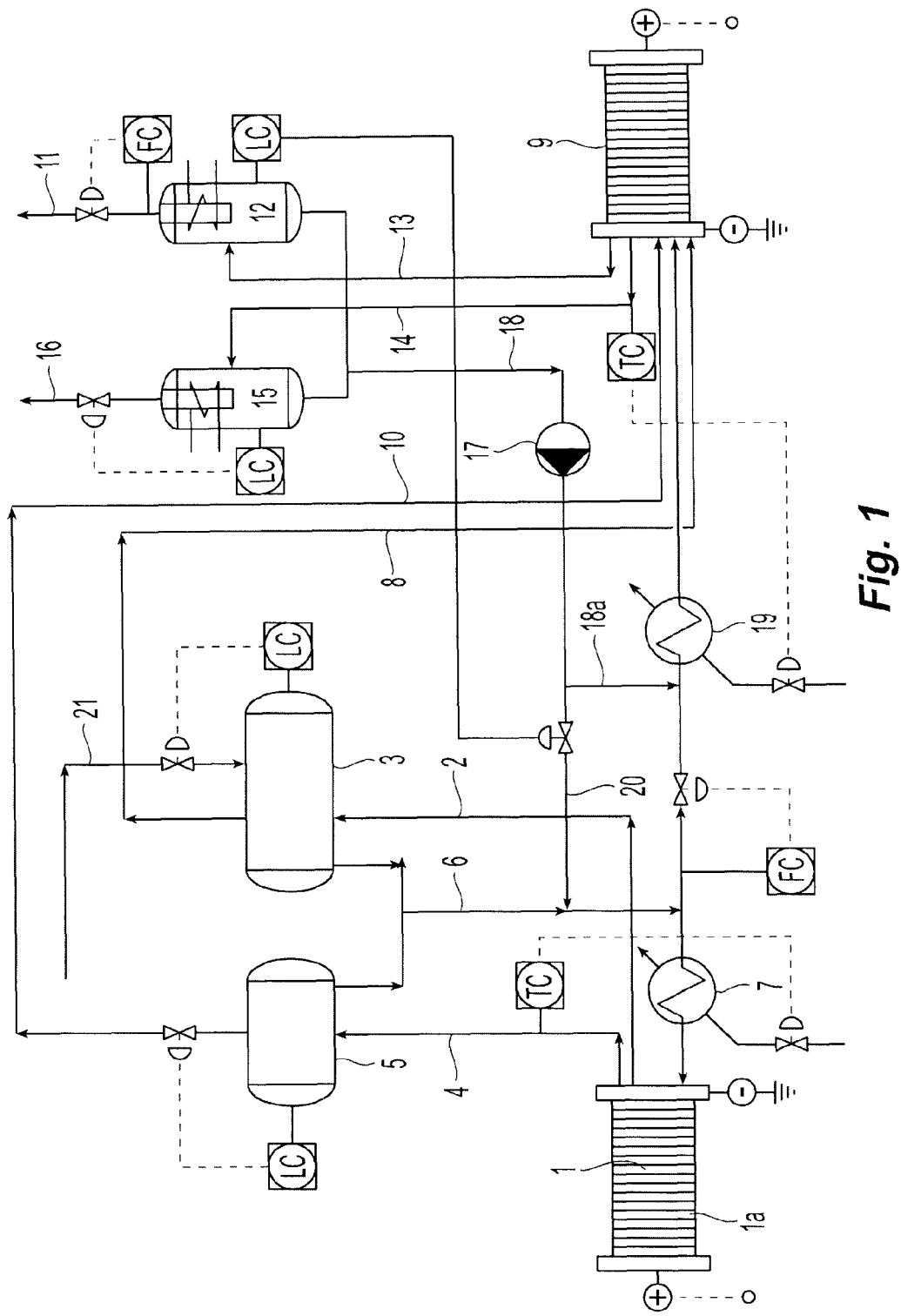

With reference to the aforesaid FIG. 1, an apparatus for the storage and redistribution of electrical energy according to the method of the present invention comprises an electrolyzer 1, made of a plurality of electrolytic cells 1a, arranged as a pack and fed, in a per se known way, with a direct electrical current, provided by a not shown power source.

The cells 1a of said electrolyzer are filled or passed through by a "liquid phase" that provides the water for the electrolysis process which is intended to be carried out. Such liquid phase can be an alkaline or acid solution, or it can be simply water.

The electrolyzer 1 is structured in order to operate under pressure and is directly in fluid communication, through a duct 2, with a pressurised tank 3 for the collection and storage of hydrogen and, through a duct 4, with a pressurised tank 5, for the collection and storage of oxygen.

The hydrogen and oxygen, generated in the electrolyzer 1 in an amount proportional to the direct current that flows through the cells 1a, directly flow to the tanks 3, 5, respectively, which are thus an integral part of the electrolyzer itself. The portion of liquid phase possibly entrained by the hydrogen and oxygen flows into the respective tanks, is separated on the bottoms thereof and is recycled to the electrolyzer 1, through a duct 6, after having been previously cooled or warmed through a heat exchanger 7.

A fuel cell 9 has anodic compartments (not shown), directly in fluid communication with the pressurised tank 3, through a duct 8, in order to be directly fed with hydrogen. The cathodic compartments (not shown, as well) of said cell 9 are directly in fluid communication with the pressurised tank 5 through a duct 10, in order to be directly fed with oxygen. Even said fuel cell 9 is filled or passed through by a respective "liquid phase", needed for the electrochemical conversion of hydrogen and oxygen in order to produce water and electrical energy.

The amount of hydrogen consumed for said reconversion depends from the instantaneous requirement of the fuel cell 9, in terms of electrical energy to be dispensed to a user downstream of it. A small flow of hydrogen is discharged from the fuel cell 9, through a duct 13, a separator 12 and a duct 11. Onto the bottom of the separator 12, there is collected the portion of liquid phase possibly entrained by said hydrogen flow from said cell.

Even the surplus of oxygen is discharged from the fuel cell 9, through a duct 16, after having previously passed through a duct 4 and a separator 15.

The portions of liquid phase of the fuel cell 9, collected in the separators 12 and 15, are recycled to the fuel cell itself through the ducts 18, 18a, by means of a pump 17, after having previously passed through a heat exchanger 19, in order to remove the heat in excess generated in said cell.

According to a first feature of the method according to the present invention, in the electrolyzer 1 and in the fuel cell 9, a same liquid phase is used. Advantageously, a liquid phase consisting of water or of aqueous solutions of electrolytes, among which there will be preferably strong alkalis, and even more preferably an aqueous solution of potassium hydroxide.

This allows the accomplishment of a second feature of such method, which consists in that the water produced in the fuel cell 9, as a consequence of the electrochemical reaction between hydrogen and oxygen, is transferred to the electrolyzer 1, where it is used to produce hydrogen and oxygen.

This task, in fact, is accomplished by the common liquid phase that, in the fuel cell, collects the water produced by the aforesaid electrochemical reaction, water which is then sent to the electrolyzer 1 by the pump 17 through the separators 12, 15 and the ducts 18 and 20. In particular, downstream of the pump 17, the liquid phase separated in the tanks 3 and 5 is advantageously added to said liquid phase transporting the water produced in the cell 9, thus forming a single aqueous flow to be fed to said electrolyzer.

Through a duct 21, water is introduced in the tank 3 just to compensate the losses associated to the flows of hydrogen and oxygen discharged by the duct 11 and 16.

The carrying out of the functional features of the method according to the present invention, i.e.: a single liquid phase for the two electrochemical processes, the use in the electrolysis process of the water produced in the fuel cell, direct communication between the electrolyzer and the storage tanks of hydrogen and oxygen, direct communication between said tanks and the fuel cell, direct communication between said fuel cell and the electrolyzer, allow to obtain an operative unit for the storage and redistribution of electrical energy, which is particularly compact and effective, individually controllable, of great flexibility of use, easy to be transported, with a reduced number of components and hence of reduced manufacturing costs.

Further acknowledged advantages, such as for example an improved fuel cell efficiency and an integrated control system for the entire apparatus, derive from the possibility, foreseen and implemented by the present invention, of making also said cell to operate under pressure, in particular at a slightly lower pressure than that of the electrolyzer and of the tanks 3, 5.

Many modification and variations may be made to the invention thus conceived, all falling within the expertise of a man skilled in the art, and as such falling within the scope of the inventive concept defined by the following claims.

What is claimed is:

1. Method of storage and redistribution of electrical energy comprising the steps of: producing hydrogen and oxygen through water electrolysis in an electrolyzer (1) operating under pressure; collecting the hydrogen and oxygen so obtained in respective pressurized tanks (3, 5) said hydrogen and oxygen pressurized tanks (3, 5) and said electrolyzer (1) all operating at substantially the same operating pressure; reconverting into water and electrical energy said hydrogen and said oxygen produced in said electrolyzer, through an electrochemical reaction of the latter in a fuel cell (9) fed from said tanks (3,5), and wherein said electrolyzer (1) and said fuel cell (9) use a single continuous liquid phase which is continuously circulated between the electrolyzer and the fuel cell and wherein the water produced in said fuel cell (9) by the hydrogen and oxygen reconversion step, is collected in the respective liquid phase and transferred together with the liquid phase to said electrolyzer (1) in order to undergo electrolysis.

2. Method according to claim 1, characterized in that said reconversion of hydrogen and oxygen in said fuel cell (9) is carried out under pressure.

3. Method according to claim 2, characterized in that the operating pressure of said fuel cell (9) is slightly lower than that of said electrolyzer (1).

4. Method according to claim 1, characterized in that said electrolyzer (1) is in direct communication with said tanks (3, 5), to which the hydrogen and oxygen obtained through water electrolysis are directly sent, and said tanks (3, 5) are in direct communication with said fuel cell (9), the hydrogen being directly fed to the anodic compartments thereof and the oxygen to the cathodic compartments thereof, respectively.

5. Method according to claim 4, characterized in that portions of the liquid phase of said electrolyzer (1) entrained into said tanks (3, 5) by the hydrogen and oxygen, respectively, are separated and collected in the tanks themselves and recycled to said electrolyzer (1), after having been cooled in an appropriate heat exchanger (7).

6. Method according to claim 4, characterized in that the hydrogen and oxygen in excess fed to said fuel cell (9) are discharged from the cell itself, whereby portions of liquid phase entrained in hydrogen and oxygen are separated, said portions being recycled in part to said cell (9) and in part to said electrolyzer (1), after having been cooled or warmed in respective heat exchangers (19, 7).

7. Method according to claim 1, characterized in that said liquid phase consists of an alkaline aqueous solution.

8. Method according to claim 7, characterized in that said liquid phase consists of water or aqueous solutions of electrolytes, among which there are preferably strong alkalis.

9. Apparatus for the storage and redistribution of electrical energy, wherein it comprises a water electrolyzer (1) provided with a respective liquid phase and operating under a predetermined pressure, pressurized tanks (3, 5) said hydrogen and oxygen pressurized tanks (3, 5) and said elctrolyzer (1) all operating at substantially the same operating pressure in direct fluid communication with said electrolyzer (1) in order to directly receive from it hydrogen and oxygen flows, respectively, a fuel cell (9), provided with a respective liquid phase and operating under a predetermined pressure, said cell (9) having anodic and cathodic compartments in direct fluid communication with said hydrogen and oxygen tanks (3, 5) in order to exclusively receive said hydrogen and said oxygen produced in said electrolyzer (1), respectively, and in direct fluid communication with said electrolyzer (1), said electrolyzer (1) and said cell (9) using a single continuous liquid phase which is continuously circulated between the electrolyzer and the fuel cell.

10. Apparatus according to claim 9, characterized in that said mutually directly interconnected electrolyzer (1), fuel cell (9) and tanks (3, 5) are grouped in a single unit.

* * * * *